Sept. 23, 1952 G. A. THOMAS 2,611,442
STEERING MECHANISM FOR TRACTORS
Filed Oct. 24, 1946 6 Sheets-Sheet 1

INVENTOR
GEORGES ALFRED THOMAS
BY
ATTORNEY

Sept. 23, 1952 G. A. THOMAS 2,611,442
STEERING MECHANISM FOR TRACTORS
Filed Oct. 24, 1946 6 Sheets-Sheet 2

INVENTOR
GEORGES ALFRED THOMAS
BY
ATTORNEY

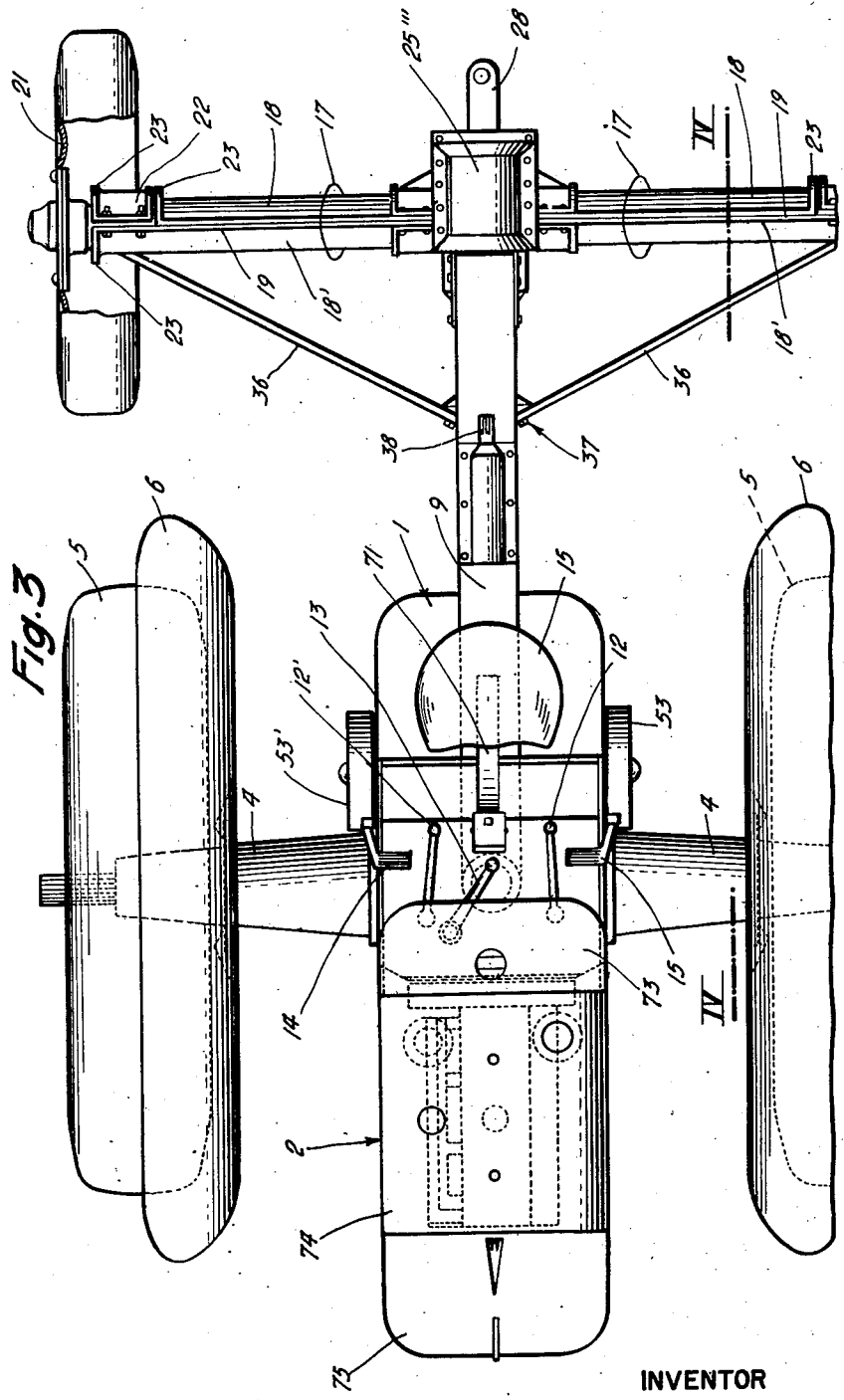

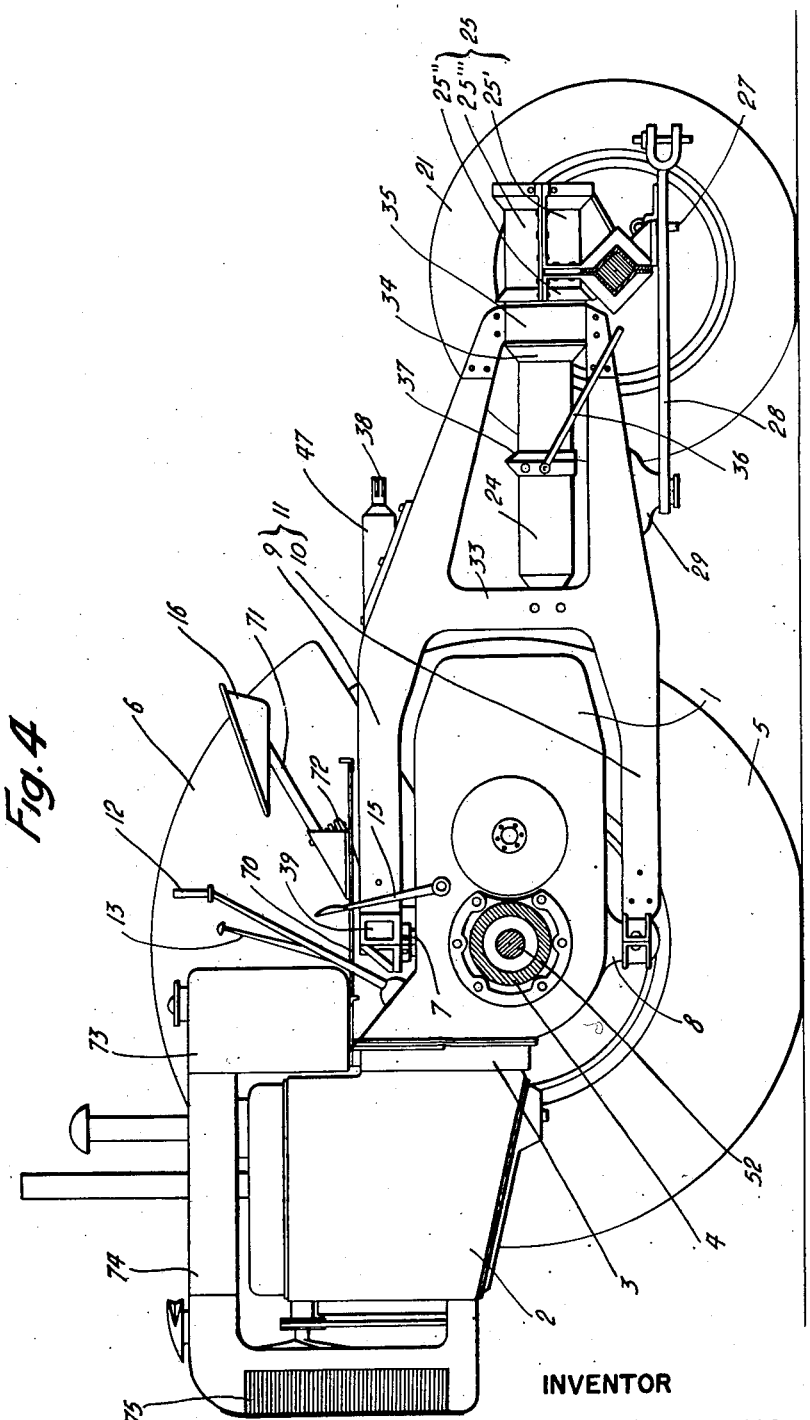

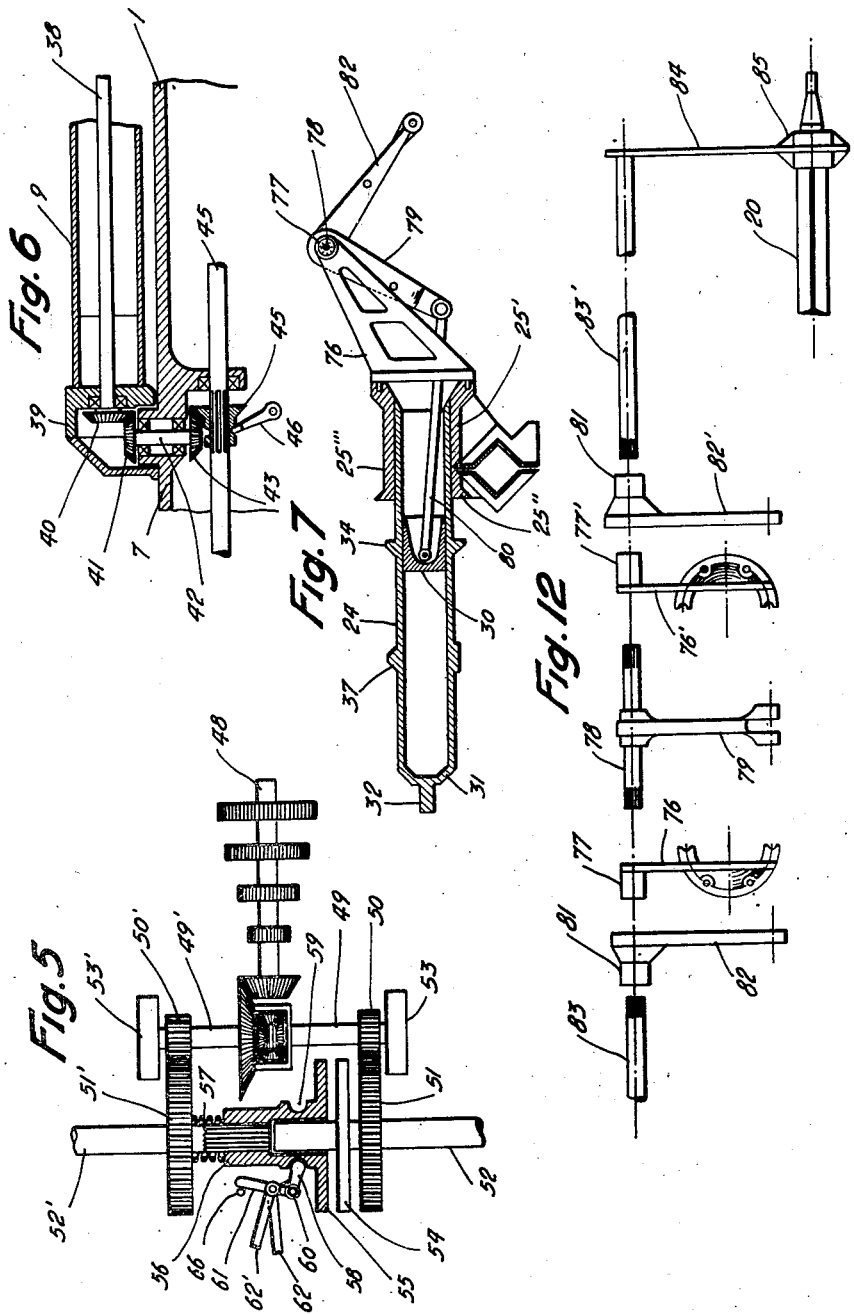

Sept. 23, 1952     G. A. THOMAS     2,611,442
STEERING MECHANISM FOR TRACTORS
Filed Oct. 24, 1946     6 Sheets-Sheet 6
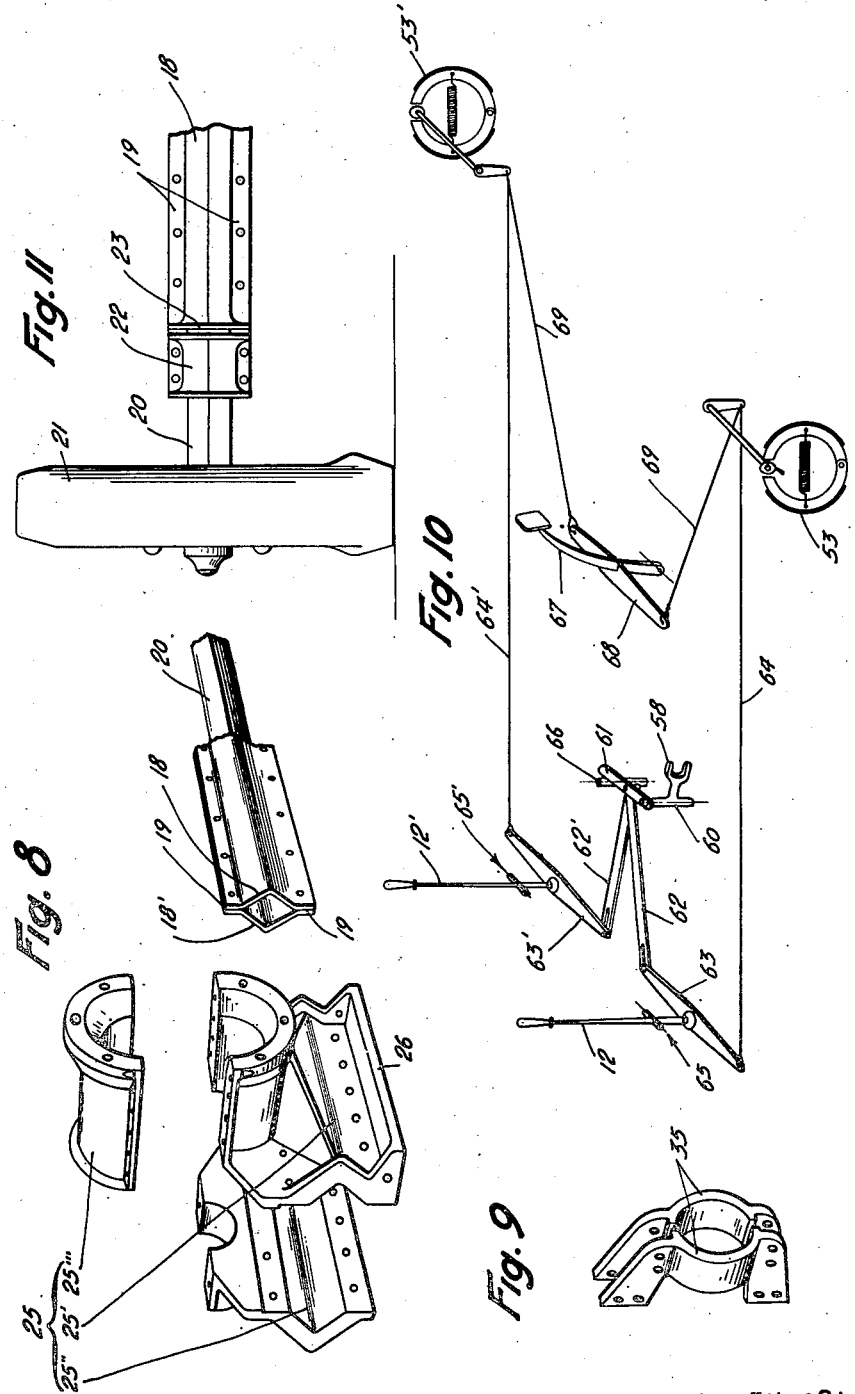
INVENTOR:
GEORGES ALFRED THOMAS
ATTORNEY Patented Sept. 23, 1952

2,611,442

UNITED STATES PATENT OFFICE 2,611,442

STEERING MECHANISM FOR TRACTORS

Georges Alfred Thomas, Paris, France

Application October 24, 1946, Serial No. 705,297
In France October 26, 1945

3 Claims. (Cl. 180—6.2)

The present invention has for its object to improve the tractors having a propelling-steering motor unit on two non-steerable driving wheels in respect to the said unit on which are mounted the motor and its accessories, the transmissions, the change-speed gear, the brakes, the steering control device, the main driving stand; a connecting frame mounted on edge and articulated, at the fore end, on two pivots of the propelling steering motor unit, the said pivots being arranged on a practically vertical axis lying near the middle of the drive wheels axis of the said unit; and a rear train connected to the connecting frame through a longitudinal shaft rotating at the rear end of the connecting frame.

According to the invention, said longitudinal shaft is tubular and forms simultaneously the cylinder of a lifting hydraulic jack (for the farm implements which may be adapted to the rear train of the tractor).

The steering of the tractor is achieved by means of two operating levers controlling simultaneously a friction clutch or "steering clutch" directly mounted on two half driving axles of the driving wheels, such clutch being normally engaged through spring pressure so as to connect together both above mentioned half axles, and braking means for each driving wheel; said braking means being controlled either directly, or individually through one of said operating levers. The steering clutch control and each driving wheel brake device are connected to a walking beam linkage which permits, by actuating one or the other of the two steering levers, to release the clutch (which releases one wheel from the other) and simultaneously puts the brake on one of them, so as to allow the wheel on which the brake is applied to slow down (or even to stop) and to keep the other moving through differential action. Thus each one of the steering levers controls the brake of a wheel and, simultaneously, the common steering clutch which connects or disconnects the wheels.

When the clutch is engaged, a straight line path is obtained for the propelling motor unit as well as the absence of any pivoting or swaying due to ground unevenness, outside, of course, the desire of the operator to intervene.

Other features and characteristics of the new tractor will show up in the course of the following detailed description based on the annexed drawing on which a realisation of the new tractor, object of this invention, has been schematically shown as a non-limiting example.

Fig. 3 is a partial view from the top.

Fig. 4 is a side elevation with a cut out section and a cross section through line IV—IV of Fig. 3.

Fig. 5 is a schematic top view of the parts assuming the driving, the braking and the connection or disconnection of the steering wheels.

Fig. 6 is a detail schematic vertical cross section showing the drive shaft provided on the connecting frame of the tractor.

Fig. 7 is a schematic longitudinal cross section of the articulation shaft of the rear frame or train mounted on the connecting frame, articulated to the propelling steering motor unit, such shaft being hollow and designed to be simultaneously used as a lifting jack cylinder.

Fig. 8 is a perspective view of certain separated elements of the connecting cross member of the rear frame to the articulation shaft of the connecting frame.

Fig. 9 is a perspective view of the two end pieces closing the rear of the connecting frame.

Fig. 10 is a schematic perspective view of the disposition of the control devices which allow steering and braking the propelling-steering motor unit.

Fig. 11 is a rear view showing a partial widening of the rear wheel track by sliding a half axle.

Fig. 12 is a rear view of certain separated parts of the lifting device, through the tractor lifting jack, of the farm implements mounted on the rear frame.

Figure 1:
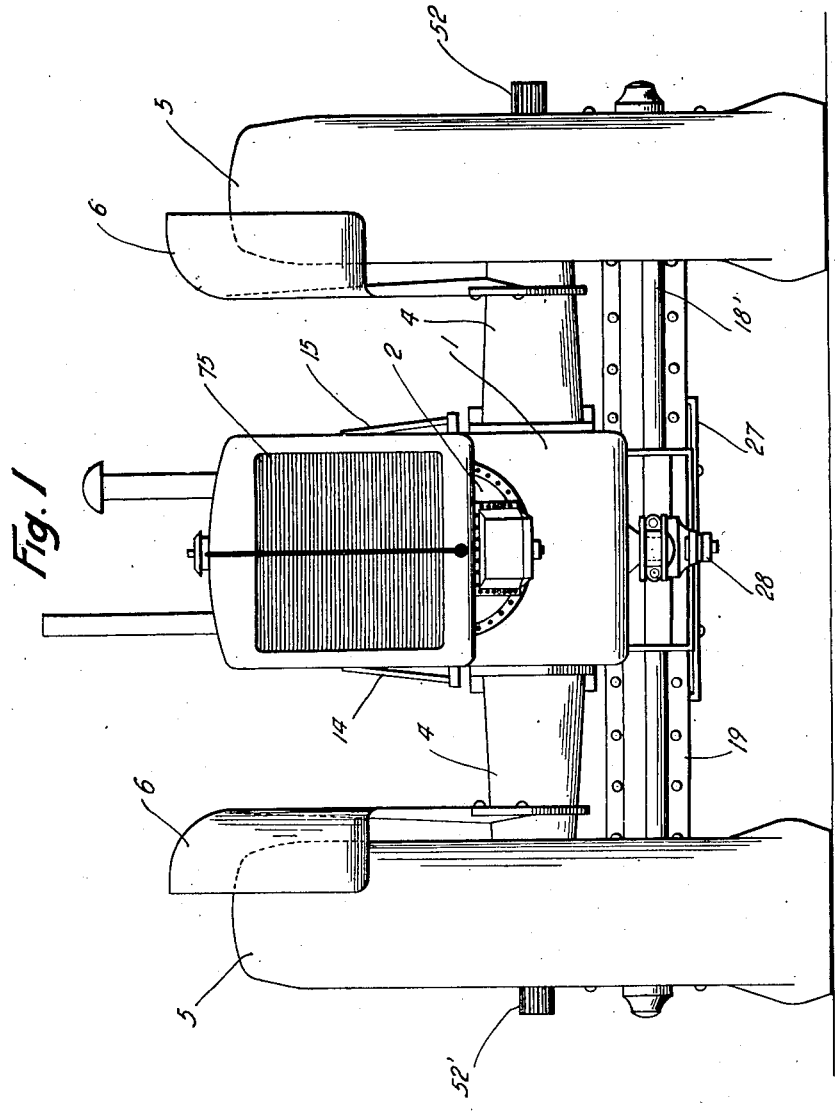
Fig. 1 is a front view of the tractor.
Figure 2:
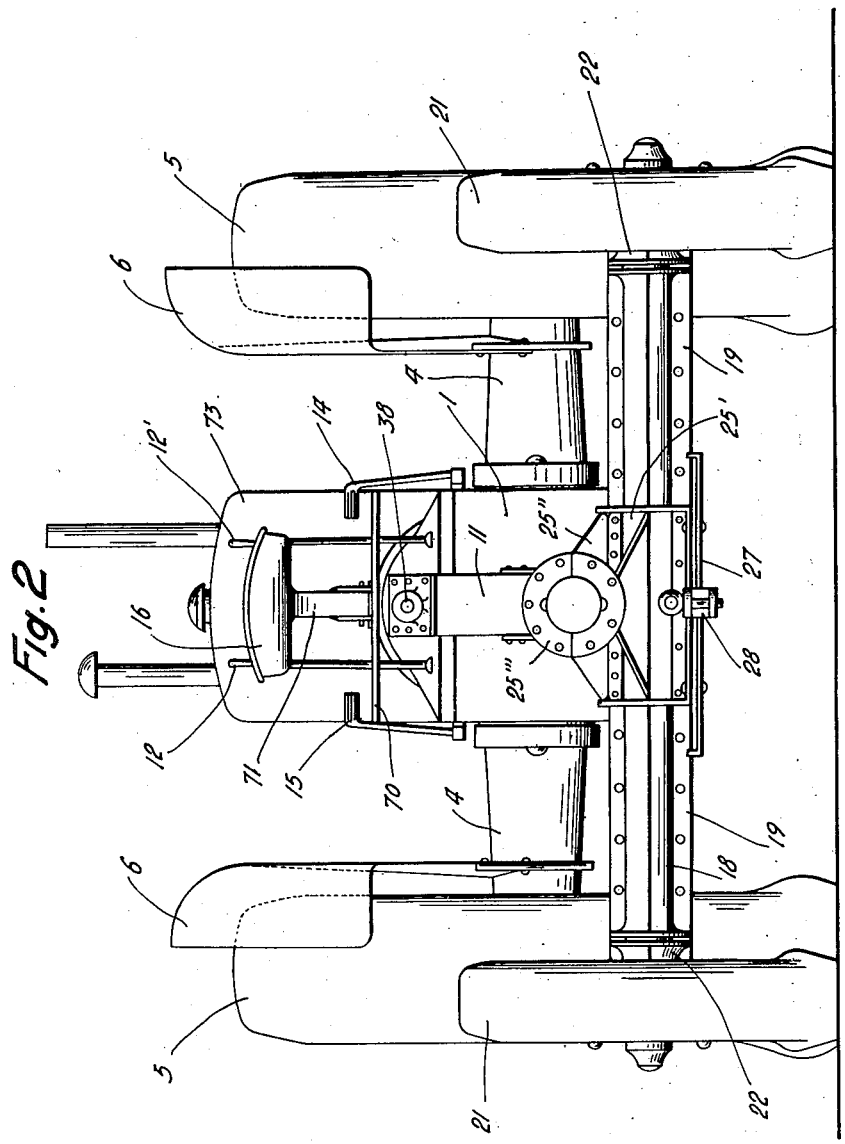
Fig. 2 is a rear view.

As can be seen on the accompanying drawings, the motor and the housing enclosing the transmission organs are respectively overhanging the front and the rear of the driving axles.

The assembly of the different housings is, in the preferred example of realisation, accomplished with bolts and studs with the interposition of appropriated seal joints.

The main housing 1 encloses the transmission organs including the gear box, the differential, the steering mechanism, the driving mechanism, the pump giving the pressure for the lifting hydraulic jack which will be described hereafter, etc.

On the main housing 1 are firmly mounted, on the one hand, in front, the motor 2 with the flywheel housing 3 (including the motor clutch) bolted on the housing 1 and, on the other hand, laterally, to the right and left and bolted with flanges provided for that purpose, the axle housing 4 enclosing two half rigid shafts or half drive axles, on the free end of which are splined two large diameter wheels 5 protected by mud guards 6 attached to axle housings 4.

The upper and lower portions of the main housing 1 include respectively two pivots 7 and 8 upon which are articulated the upper arm 9 and the lower arm 10 of a connecting frame 11. The upper pivot 7 is bored and houses a pair of bevel gears for the drive of which will be described below.

It may be seen that the main housing 1 is the heart of the front propelling steering motor unit and consequently it must be strong; such assembly (which is the heaviest part of the tractor) being directly supported by the two large driving wheels 5. Access doors (for adjusting), partitions, housings for bearings and shafts must, of course, be provided for in housing 1, as well as wheels and reinforcing fillets.

On housing 1, steering levers 12 and 12', change gear control levers 13, drive control lever, lifting jack pump control lever, brake pedal 14 and clutch pedal 15, the driver's seat 16, the tank, etc., must be provided for.

The rear end of the tractor, which is entirely reserved for farm implements' use, has been specially designed for that purpose. Such portion includes a frame 17 used as a two wheel axle, and is entirely clear from the tractor unit and on which the width of the track can be changed on a large range.

Such frame axle is constituted with sturdy pieces and easily accessible and strong bearing supports can be put along its whole length (even when the track width is maximum) for any implements that may be desired to be adapted on it. Therefore, it is possible to attach quickly to the said frame any usual farm implement for which it is then utilised as frame and axle, thus giving to such implements (without any weight addition) the advantages of its wheels, its rigidity, its sturdiness and a very powerful hydraulic jack forming one piece with it and which will follow all its oscillations.

The rear frame can be built in assembling the parts (plates or tubing) by welding them together. In the preferred form of realisation, such frame is constituted by two side members 18, 18' in pressed steel of V shape with welded or riveted side flaps which form stiffeners 19, set vertically to increase the flexion resistance of the unit.

The tubular hole, with a square section for example, provided between parts 18 and 18' can receive two steel half axles 20, also square as an example, such axles being in the best position to counteract to their maximum, the vertical flexion as well as the horizontal deformation.

The free ends of half axles 20 are turned to receive the bearings for the rear wheels 21. These axles 20, which regulate the width of the track by sliding in the frame, are maintained in the desired spread position by the following disposition of the side member ends; one of the side member 18' is a few centimeters longer at both ends. Such differences in length are compensated, on the shortest side member 18, by two caps 22 of the same shape. Such caps, suitably stiffened by transversal webs, are bolted on the side flaps 19 on the opposite overlapping portions of side member 18'. The side members are also reinforced by transversal webs 23. It can be seen that the square shapes 20 can be made fast in the desired position by tightening the caps 22 with the lower and upper bolts.

The upper and lower side flaps 19 of the united side members are perforated so as to give many attaching points for the different farm implements.

In the middle of the side members, at right angles thereto and on top of them is placed a shaft which permits the pivoting in a vertical plane of the rear frame in relation to the connecting frame. This shaft, which can rotate in the rear portion of the connecting frame and which slightly overhangs the rear of the said frame, is constituted by a tube 24 of a rather large section forming simultaneously the cylinder for the lifting jack which will be dealt with below. The assembly of the rear frame with tubular shaft 24 is preferably realised with heavy cast parts 25 which are closely mating the outside contour of parts 18—19 and 24 which must be assembled and which are shown in detail on Fig. 8. Such parts separately designated as 25', 25'' and 25''' are bolted together so as to constitute a rigid block which is the heart of the rear frame. The rear lower part 25' is provided at its base with a portion 26 in angle shape which is reinforced by fillets and can casually receive any useful part, especially an angle iron guide 27 for an oscillating draw-bar 28 articulated at 29 at a point placed on the lower part of connecting frame 11.

As it has been explained heretofore, the tubular shaft 24 is used simultaneously as an hydraulic jack cylinder, and to that effect, is bored accurately to allow the displacement of a piston 30 which can be actuated by hydraulic pressure (or pneumatic, also by motor inlet vacuum, etc.).

The cylinder 24 is obturated in the front end by a plug 31 provided with a central pivoting stud rotating in an appropriate bearing forming part of the vertical member 33 of the connecting frame 11. At an adequate point on its length the cylinder 24 is shouldered at 34 bearing on the inside of a bearing constituted with two symmetrical pieces 35 forming the assembly piece of the rear of said frame 11. Finally, two strut rods 36 attached, on the one hand, to the side flaps of the ends of side members 18', the longest one (the front side member) and, on the other hand, to the tubular shaft 24 on a shoulder 37 provided for that purpose; such strut rods forming a triangle with the rear frame, thus stiffening it materially.

As it has been explained above, the front propelling steering motor unit and the rear axle frame are mechanically connected and articulated upon one another by frame 11. Such frame, which is set on edge, includes an upper side member 9 and a lower side member 10 preferably with a U cross section and with their rear ends forming a triangle the apex of which being assembled by the parts 35 described above, such parts being fixed together with bolts and fitted over the sides of the U of the side members 9 and 10 so as to form a bearing suitably bored to receive the pivoting tubular shaft 24. Between the apex of the rear triangle of the connecting frame and the front ends of side members 9 and 10 (such ends being articulated to the propelling steering motor assembly housing as previously described) is the vertical U cross member 33 from where the side members are curved to become practically parallel and to form the two branches of a yoke. Between the cross member 33 and their ends both side members 9 and 10 have a box shaped section obtained by welding on said members sheet steel plates giving great rigidity to the frame. At the pivoting points 7 and 8, the front side member ends are provided with bearings and caps with attaching lugs fitted in the closed branches of the said side members and made fast to them, the bearings aforedescribed being bored on the same axis.

It may be noted that the axis of the tubular shaft 24 bearing bores is practically at right angles with the bore axis of the bearings provided at both ends of arms 9 and 10 of the frame 11.

The upper branch 9 of the frame is designed to be used, as it may be seen more particularly on Fig. 6, as housing for the power take off shaft 38. As shown on Fig. 6, the bearing body 39 which articulates the upper branch 9 of the frame opens up so as to form a small housing for a pair of bevel gears 40 and 41; the bevel pinion 40 is splined on the inside end of shaft 31 and the bevel pinion 41 is splined on the end of shaft 42 which is rotating on bearings carried by the hollow pivot 7 of housing 1; on the inside end of shaft 42 is keyed a bevel pinion 43 meshing with a pinion 44 which can slide, while bound to rotate with primary shaft 45 of the gear box (such shaft being after the clutch). The position of pinion 44 (meshing or out of mesh with pinion 43) is controlled by a fork 46 controlled from the outside of housing 1 by an appropriate shaft and lever (not shown on the drawing).

The free rear end of shaft 38 sticks out of the frame tubular branch where the upper side member inclines down towards the rear apex of the triangle. The projecting end of shaft 38 rotates in a bearing 47 of suitable shape bolted on that portion of the connecting frame.

In case of a large construction the connecting frame could be economically made of two pressed steel half shells with the side flaps welded together.

The yoke forming the front part of the connecting frame, as shown on the drawing, follows the rear contour of the main housing 1 with a sufficient clearance. Due to its small depth and its being placed on edge, the connecting frame 11 permits a minimum turning radius of the propelling-steering wheels (meaning of the propelling-steering motor unit) and assures a very good visibility of the work from the seat of the operator. As it has already been described, the tractor front wheels are both driving and steering; due to the general design of the vehicle, they have a very high adherence for driving as well as for steering because they carry the most of the total weight of the tractor.

Due to the general design of the tractor, the front driving steering unit can be directed independently of the connecting frame in case of a change of direction.

The steering is obtained by the operation of a brake operating directly or indirectly on the wheel located on the side where the tractor must turn. The difference in speeds between the wheels, such difference resulting from the voluntary application of the brake by the operator (through the action of one or two steering levers 12 and 12') and from the normal operation of the differential, provides the pivoting and a new orientation of the propelling unit in relation to the rear axle frame and to the connecting frame on which is articulated the aforesaid unit.

Outside the gear box, of which secondary shaft 48 (located below primary shaft 45) can be seen on Fig. 5 the transmission includes a usual, differential mechanism of which the two half planetary shafts 49—49' drive through pinions 50 and 50', respectively meshing with gears 51—51' of large diameter, the two half drive axles 52 and 52' on which are splined the aforesaid gears and the wheels 5.

On the ends of the half planetary shafts 49 and 49' are located two brakes 53 and 53' of any adequate type and arranged either inside the housing in a closed oil-proof compartment, or outside of the housing on suitable extensions of the aforesaid planetary shafts. Such brakes apply to the wheels (which they respectively control) a retarding action which can go to a full stop according to the operator's will.

Such result is possible through the combination of the following devices: To maintain the propelling steering motor unit on the desired orientation through the application of the brakes by the operator, to assure its straight running and to prevent any changes of direction due to variations of soil conditions, in other words, to entirely maintain the orientation of the propelling steering motor unit in the hands of the operator, the new tractor comprises a new particular design which can be seen more specially on Figs. 5 and 10.

On both half axles 52 and 52' are mounted the two halves of a clutch, preferably of an appropriate friction type (called here "steering clutch") and enclosed in an oil-proof housing if such clutch operates dry. As shown on Fig. 5, the clutch parts are located in the space between the two gear wheels 51 and 51'.

In the schematic example shown on the aforesaid figure, such clutch includes a plate 54 made fast to the half drive axle 52 and a plate 55 made fast to a sleeve 56 which can slide on half drive axle 52 but bound to rotate with it; a spring 57 keeps constantly in contact plate 55 against plate 54, therefore, maintaining the connection between both tractor wheels 5. To release the clutch thereby disconnecting both wheels 5, plate 55 can be disengaged from plate 54 by means of fork 58 which is engaged in groove 59 of sleeve 56 and mounted on a vertical pivoting shaft 60 on the end of which is a lever 61 firmly connected to fork 58. On the lever 61 and at a common point, are articulated two rods 62—62' the other ends of which being articulated to the inner ends of two walking beams 63 and 63' with their opposite ends connected, for example, through cables 64—64', to the brake control levers 53—53'. Each one of both walking beams 63—63' is controlled by a pivoting or steering lever 12—12' pivoting at 65 and 65'. Through a correct computation of the relative lengths of the walking beam arms 63 and 63', the control of each one actuates the steering clutch by priority and the application of the brake corresponding to the opened lever follows immediately. In order to limit the travel of the clutch control lever 61, a stop 66 is provided so that as soon as the clutch is released, lever 61 becomes a rigid fulcrum for the walking beams which keep on their effective action on the corresponding brakes.

The new design providing a friction clutch acting directly on the driving half axles of the tractor driving wheels is very important. It permits an absolute connection of wheels 5 in the cluch connecting position (without any angular floating), which would be impossible to get if the wheel connection would be realised between the transmission organs located before the half drive axles, for instance by blocking the differential. As a matter of fact, the gear back lash of the various gears would have to be taken into consideration; such back lashes, as small as they may be, would add up and would create angular displacements which, on account of the large wheel diameter, would permit them to move individually a distance of several centimeters in either way; there would then also exist an undesirable tractor floating around its pivoting axis and uncontrollable by the operator.

The linkage between the steering organs through rods and walking beams simplifies the tractor drive, bringing it down to a single operation and prevents at any time that the tractor becomes independent of its steering. To avoid that the operation of one of the steering control levers moves automatically the other, rods 62 and 62' ending at lever 61 used for the steering clutch control are sliding at one of their ends (towards the walking beams as shown on the drawing) so that they are only effective in the pulling direction. Such rods can, of course, be replaced by cables or chains, and the walking beams can as well be replaced by pulleys, gear wheels, etc. As another interpretation, an hydraulic transmission may be considered which would have the same effect as a mechanical transmission without getting out of the limits of the invention.

It is easily understood that beside the regular steering control, if the levers 12 and 12' are not used by the operator, the automatic connection of both half drive axles of wheels 5 is assured, which means that any amount of rotation of one of the two wheels corresponds to an absolutely equal amount of rotation of the other. Thus the tractor can run on a perfectly straight line which is an important advantage in farm work.

It must also be noted that the replacement of the friction steering clutch (54 and 55) by a jaw or a dog clutch, such as commonly used, to lock the differential in order to prevent the sliding of one of the wheels and to decrease to a minimum the adherence limit, would not be suitable as an accurate working organ for the steering of the tractor, object of the invention. In fact, the angular interval between the jaws or the teeth of such clutches is such, that the coincidence permitting their engagement can only be obtained by a rather large angular displacement of the wheels, which would prevent, in the majority of cases, the clutch engagement for the determined direction as desired by the operator and would eliminate precision and safety as well.

Moreover, the new design offers the important advantage of distributing the motive power between the two wheels 5 on a straight line as well as in the curves while automatically eliminating the differential effect on straight running, which helps for a greater effort of traction on all soils.

The foot brake provided to retard or stop the tractor can act on the same brakes 53 and 53' actuating the steering. This foot brake is shown on the drawing as a pedal 67 operating walking beam 68 of which the ends are connected through cables 69 to brakes 53 and 53' which are then simultaneously controlled. To block the wheels to a stop, the foot brake can be locked by a ratchet as usual.

The gear box which can be of any standard type is not described in detail as it is not a part of the invention. However it must be noted that, as the drive of the shaft 38 is done before the gear box, that shaft may be driven by the motor even when the tractor is stopped, that is when the gear box is idle. To prevent the flexion of the shaft, at the bevel gear 44, that shaft is guided in a bearing located in a boss, part of the upper section of the housing.

A protecting partition 70 made in sheet steel stiffened by pressed in or added webs is attached above the housing 1 to keep the operator's feet away from the upper arm 9 of the connecting frame. Partition 70 is laterally opened so as to leave the necessary space for the displacement of the arm 9 while turning the tractor. At the maximum steering lock, that arm (or the lower arm 10) can actuate a control drive, not shown, so as to engage the steering clutch 54—55, which will prevent the skidding of the rear wheels during that position of maximum steering lock. Partition 70 supports, as can be seen, the driver's seat 16 located at the end of a support 71 resting on a spring 72 by its lower end. In front of the partition and on top of the motor clutch are two angle irons supporting fuel tank 73. A sheet steel hood 74 connects the fuel tank to the radiator shield 75 bolted to the motor front through supports provided for that purpose.

The lifting jack cylinder 24 used simultaneously as the horizontal articulation shaft for the rear tractor train can be used for many purposes. Among them, it can be utilised as any lifting device; it can particularly be used for the lifting of farm implements mounted directly on the rear of the frame or carried on it. Such an implement control is shown schematically in Figs. 7 and 12. As shown in the figures, two arms or supports 76 and 76' are bolted on the cast iron bracket locked on the protruding end of the jack cylinder 24, such supports 76 and 76' being provided at their upper ends with two bearings 77 and 77' in which rotates a transversal shaft 78 on which is keyed a lever 79; the lower end of which being articulated to the connecting rod 80 of jack piston 30. The splined ends of shaft 78 extending beyond bearings 77 and 77' are engaged in the splined bore of two hubs 81 connected firmly to lifting levers 82 and 82'. The hubs 81 and 81' are of such dimensions that after their engagement on the splined ends of shaft 78, there is still enough splined length to receive the splined end of auxiliary shafts 83 and 83' which can be supported by brackets 84 fixed on square shaft 20 by means of flanges 85. Shafts 83 can receive one or several lifting levers.

The ends of the levers 82' are connected to the implements to be lifted through links or any other adequate means.

It must be noted that the pipe (not shown) from the jack to the pump supplying the pressure, includes two flexible lines viz one close to the jack (that is, close to the articulation shaft of the rear train) and the other, near one of the pivots (upper or lower) of the connecting frame.

The pump which is used is preferably of a continuous output type of pump so that the control of the jack requires only the opening or the closing of the oil line.

The new tractor presents numerous advantages among which can be noted an important increase of the propelling and steering adherence coefficient and therefore, an improved tractor efficiency through the decrease in weight, which finally ends by a lowering of the cost of fabrication and utilisation.

The new tractor is as much a tractor as a universal farm equipment due to its suitability for the quick and easy adaptation of any existing implements including front supported trailers. The many fixation points, at different heights above the ground permit the convenient trailing of ordinary trailers and of old implements; the implements carried on the tractor keep their independence, particularly as far as steering of trailed implements is concerned, while having all the advantages of carried implements, concerning the lifting, the guiding and the adjusting.

The tractor is influenced in steering neither by the traction pull coming from the outside of the tractor axis, nor from the lateral reactions of plows.

The lifting of very heavy implements does not raise the nose of the machine. By having the articulation axis between the steering-motor unit and the connecting frame, passing near the middle of the axis of the front axle, it is possible to handle and to steer the tractor very easily even with the heaviest pull.

The specially designed form of the connecting frame and the rigidity thus obtained, the large interval separating vertically the two articulation pivots of the propelling and steering motor unit on the frame, assure a sufficient bearing for the front unit and allow the frame to withstand, without any flexion, the motive reaction, which is quite interesting for powerful and large size tractors. The combination of the rear train articulation shaft with the hydraulic lifting jack offers the advantage of solving perfectly and simultaneously the problem of over-all size of such type of machine and the connection difficulty between the lifting jack and the working implements.

The new steering device permits also installing the driver's seat on the rear frame, with a control station to execute such jobs as harrowing. The connection between the normal driving station and the driver's seat, transferred rearwards, can easily be established through Bowden cables, hydraulic control, rods or any other appropriated transmission system.

Accessorily, both rear half axles 20 can easily be provided with steering king pins similar to those usually employed and well known in the automobile industry. The orientation of such king pins, in the case of young plant harrowing, can be controlled through a hand wheel or a lever actuated by a workman specially charged with watching the harrowing and who can be sitting on a movable seat adapted on the rear frame. For any other jobs less accurate, the orientation of the rear wheel can automatically be obtained through the connection of the rear steering system with the propelling steering motor unit by means of an adequate linkage. The four wheels of the tractor, object of the invention, would thus have a common steering system and the turning radius would be still greatly decreased.

It is evident that the example of realisation of the new tractor, object of the invention, above described and represented on the accompanying drawing is given only as indicative and non-limitative and the new tractor's details can be modified without stepping out of the limits of this invention.

What I claim is:

1. In a vehicle of the type having a main body, an engine mounted on said body and two half drive axles projecting out of said body; steering mechanism comprising a differential driving gear for operatively connecting the engine to the two half drive axles, two independent brakes each operative to brake one of the half drive axles, a friction clutch having two engageable friction members each of which is directly keyed on a corresponding half drive axle and operative when engaged to couple together said half drive axles without rotatory backlash, control means for said clutch, control means for each brake and steering means operatively connected to the control means for the clutch and to the control means for the brakes and adapted to simultaneously control said clutch and selectively one of said brakes.

2. In a tractor of the type having a front driving wheel portion constituted by a main housing, an engine mounted on said housing, two half drive axles projecting out of said housing, a driving wheel keyed on each half drive axle, and a rear wheel portion that is pivotally connected to the front portion about a substantially vertical axis; steering mechanism comprising a driving shaft operatively connected to the engine, two driven shafts, differential gear means operatively connecting the driving shaft to the driven shafts for differentially driving the said driven shafts, a pinion and a rotating brake member both keyed on each driven shaft, a friction clutch having two engageable friction members each of which is directly keyed on a corresponding half drive axle and operative when engaged to couple together said half drive axles without rotatory backlash, a toothed wheel keyed on each half drive axle and in mesh with said pinion on the related driven shaft, control means for said clutch, two non-rotating braking members each operatively coacting with a corresponding rotating brake member for braking the corresponding driven shaft, means for controlling each non-rotating braking member and steering means operatively connected to the control means for the clutch and to the control means for the brakes and adapted to simultaneously control said clutch and selectively one of said brakes.

3. In a tractor of the type having a front driving wheel portion constituted by a main housing, an engine mounted on said housing, two half drive axles projecting out of said housing, a driving wheel keyed on each half drive axle, and a rear wheel portion that is pivotally connected to the front portion about a substantially vertical axis; steering mechanism comprising a driving shaft operatively connected to the engine, two driven shafts, a differential gear operatively connecting the driving shaft to the driven shafts for differentially driving the said driven shafts, a pinion and a rotating brake member both keyed on each driven shaft, a friction clutch having two engageable friction members each of which is directly keyed on a corresponding half drive axle and operative when engaged to couple together said half drive axles without rotatory backlash, a toothed wheel keyed on each half drive axle and in mesh with said pinion on the related driven shaft, control means for said clutch, two non-rotating braking members each operatively coacting with a corresponding rotating brake member for braking the corresponding driven shaft, means for controlling each non-rotating braking member, two steering levers pivotally mounted on the main housing, a walking beam pivoted at the lower end of each steering lever, a traction member for connecting one end of each walking beam to the control means of the clutch and a second traction member for connecting the other end of each walking beam to the control means of the related one of the non-rotating braking member.

GEORGES ALFRED THOMAS.

(References on following page)

REFERENCES CITED

The following references are of record in the file of this patent:

UNITED STATES PATENTS

| Number | Name | Date |
|---|---|---|
| 551,318 | Ingoldsby | Dec. 10, 1895 |
| 970,328 | Hancock | Sept. 13, 1910 |
| 1,128,064 | Senderling | Feb. 9, 1915 |
| 1,305,506 | Townsend | June 3, 1919 |
| 1,318,557 | Heinze | Oct. 14, 1919 |
| 1,368,436 | Higginbotham | Feb. 15, 1921 |
| 1,396,956 | Hawthorne | Nov. 15, 1921 |
| 1,419,014 | Burtnett | June 6, 1922 |
| 1,419,113 | Patitz | June 6, 1922 |
| 1,484,974 | Storey | Feb. 26, 1924 |
| 1,758,584 | Rarig | May 13, 1930 |
| 1,758,806 | Saives | May 13, 1930 |
| 1,775,039 | Hilton | Sept. 20, 1930 |
| 1,953,360 | Moree | Apr. 3, 1934 |
| 2,080,692 | Brown | May 18, 1937 |
| 2,235,457 | Lorimore | Mar. 18, 1941 |

FOREIGN PATENTS

| Number | Country | Date |
|---|---|---|
| 24,170 | Great Britain | Oct. 25, 1913 |